United States Patent Office 3,166,572
Patented Jan. 19, 1965

---

3,166,572
SUBSTITUTED [(α-NITROALKYL)BENZYLTHIO] ALKYLAMINES
Robert C. Tweit, Wilmette, Ill., assignor to G. D. Searle & Co., Chicago, Ill., a corporation of Delaware
No Drawing. Filed Sept. 10, 1962, Ser. No. 222,614
20 Claims. (Cl. 260—340.5)

The present invention is concerned with novel nitro-alkylthioalkylamines together with a process for their manufacture. These compounds are more particularly described as substituted [(α-nitroalkyl)benzylthio]alkyl-amines and are represented by the structural formula

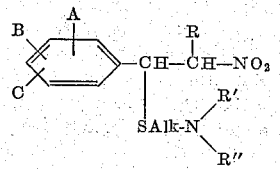

wherein A, B, and C can be hydrogen, a halogen of atomic weight less than 100, or a lower alkyl, nitro, methoxy, cyano, or trifluoromethyl radical, A and B together can comprehend a methylenedioxy

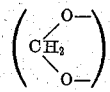

group, R, R′, and R″ can be hydrogen or a lower alkyl radical, and Alk represents a lower alkylene radical.

The lower alkyl radicals represented by the A, B, C, R, R′, and R″ terms are typified by methyl, ethyl, propyl, butyl, pentyl, hexyl, heptyl, and the branched-chain isomers thereof. The term Alk comprehends lower alkylene radicals such as methylene, ethylene, trimethylene, tetramethylene, pentamethylene, and the branched-chain groups isomeric therewith. The halogens contemplated by the A, B, and C symbols are fluorine, chlorine, and bromine.

A process suitable for the manufacture of the compounds of this invention involves the addition of a mercaptoalkylamine hydrochloride to a substituted β-nitrostyrene, as is illustrated below:

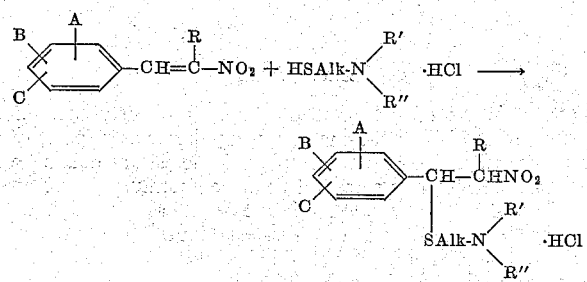

This process is preferably carried out in an inert polar solvent such as a lower alkanol. Although this reaction will proceed without added catalyst, the preferred conduct of the process involves the addition of a catalytic quantity of a strong base. Typical catalysts suitable for this purpose are alkali metal hydroxides, such as sodium hydroxide and potassium hydroxide, and lower molecular weight aliphatic and cycloaliphatic amines such as diethylamine, triethylamine, pyrrolidine, piperidine, etc.

The compounds of this invention are conveniently isolated as the hydrochloride salts, and the corresponding free bases can be isolated therefrom by methods well-known to those skilled in the art. As a specific example of the instant process, β-nitrostyrene in methanol is treated with 2-mercaptoethylamine hydrochloride in the presence of a catalytic quantity of pyrrolidine to yield 2-[(α-nitro-methyl)benzylthio]ethylamine hydrochloride. Neutralization of the latter salt, typically with aqueous sodium carbonate, results in 2-[(α-nitromethyl)benzylthio]ethyl-amine.

Equivalent to the organic bases of this invention are the corresponding non-toxic acid and quaternary salts, for example the citrate, tartrate, maleate, ascorbate, gluconate, lactate, succinate, phosphate, sulfate, hydrobromide, hydrochloride, methiodide, ethiodide, methochloride, methobromide, methosulfate, and ethosulfate.

The compounds of this invention are anti-bacterial and anti-fungal agents as is evidenced by their ability to inhibit the growth of *Bacillus subtilis*, *Escherichia coli*, *Salmonella typhosa*, *Aspergillus niger*, and *Trichophyton mentagrophytes*. They possess also anti-inflammatory activity as is indicated by their inhibition of the edema associated with inflammatory states. In addition, these compounds are able to suppress appetite by action on the central nervous system.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

This application is a continuation-in-part of my co-pending application, Serial Number 14,492, filed March 14, 1960, and now abandoned.

Example 1

To a solution of 55 parts of β-nitrostyrene in 300 parts of methanol is added 40 parts of 2-mercaptoethylamine hydrochloride and one part of pyrrolidine. This mixture is warmed to achieve homogeneity, then is filtered through diatomaceous earth. The crystals which separate on cooling are collected by filtration and dried to afford 2-[(α-nitromethyl)benzylthio]ethylamine hydrochloride, M.P. 152.5–154.5°. This compound is represented by the structural formula

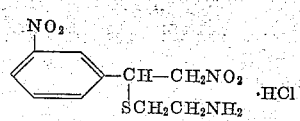

Example 2

A mixture of 9.7 parts of 3,β-dinitrostyrene with 80 parts of methanol is warmed to achieve solution, then is treated with 5.6 parts of 2-mercaptoethylamine hydrochloride and 0.1 part of pyrrolidine. This warm solution is filtered through diatomaceous earth, then is concentrated and cooled, resulting in crystallization of the product. Recrystallization from methanol affords pure 2-[(α-nitromethyl)-3-nitrobenzylthio]ethylamine hydrochloride, M.P. 129–135°. It is represented by the structural formula

Example 3

A solution of 9.2 parts of 4-chloro-β-nitrostyrene in 10 parts of benzene and 10 parts of ether is treated with 5.7 parts of 2-mercaptoethylamine hydrochloride and 0.1 part of pyrrolidine. Cooling and dilution with ether results in crystallization of the product, which is collected by filtration and dried to afford 2-[(α-nitromethyl)-4-chlorobenzylthio]ethylamine hydrochloride, M.P. 131.5–133.5°. Its structure is illustrated below:

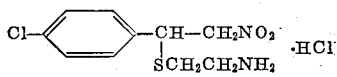

Example 4

To a mixture consisting of 4.8 parts of 3,4-methylenedioxy-β-nitrostyrene, 2.8 parts of 2-mercaptoethylamine hydrochloride, and 16 parts of methanol is added 0.15 part of pyrrolidine. The reaction mixture is stirred until homogeneous, then is stored at room temperature for about 24 hours, and finally is treated with ether and heated gently. The resulting crystals are collected by filtration and dried to afford 2-[(α-nitromethyl)-3,4- methylenedioxybenzylthio]ethylamine hydrochloride, M.P. 147–153° (dec.). This substance is represented by the structural formula

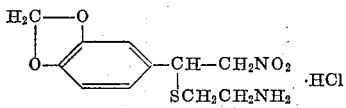

Example 5

A mixture of 4.1 parts of 4-methyl-β-nitrostyrene, 2.8 parts of 2-mercaptoethylamine hydrochloride, 0.15 part of pyrrolidine, and 12 parts of methanol is warmed until homogeneity is achieved, then is filtered through diatomaceous earth. Dilution of the filtrate with ether initiates crystallization of the product, which is removed by filtration and recrystallized from methanol-ether to afford pure 2-[(α-nitromethyl)-4-methylbenzylthio]ethylamine hydrochloride, M.P. 155–157°. It is represented by the structural formula

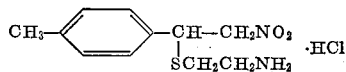

Example 6

A mixture of 4.9 parts of 4,β-dinitrostyrene, 2.8 parts of 2-mercaptoethylamine of hydrochloride, 0.15 part of pyrrolidine, and 28 parts of methanol is heated to the reflux temperature, then is filtered through diatomaceous earth. The filtrate is concentrated to approximately one-half volume, then is cooled, and the resulting crystals are isolated by filtration, then dried to yield 2-[(α-nitromethyl) - 4 - nitrobenzylthio]ethylamine hydrochloride, M.P. 155–156° (dec.). Its structural formula is illustrated below:

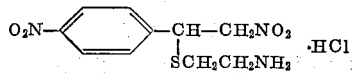

Example 7

A mixture containing 2.9 parts of 4-methyl-3,β-dinitrostyrene, 1.4 parts of 2-mercaptoethylamine hydrochloride, 0.15 part of pyrrolidine, and 12 parts of methanol is heated gently until complete solution occurs, then is filtered through diatomaceous earth. The filtrate is diluted with ether, and the resulting crystals are collected by filtration, then dried to afford 2-[(α-nitromethyl)-4-methyl-3-nitrobenzylthio]ethylamine hydrochloride, M.P. 157–161° (dec.). This compound is represented by the structural formula

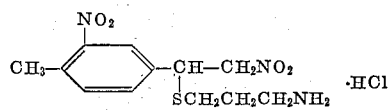

Example 8

A mixture of 5.7 parts of 4-chloro-3,β-dinitrostyrene, 2.8 parts of 2-mercaptoethylamine hydrochloride, and 8 parts of methanol is treated with 0.15 part of pyrrolidine. The resulting solution is filtered and the filtrate is treated with ether to precipitate the product. Recrystallization from acetone affords pure 2-[(α-nitromethyl)-4-chloro-3-nitrobenzylthio]ethylamine hydrochloride, M.P. 187–188° (dec.), as represented by the structural formula

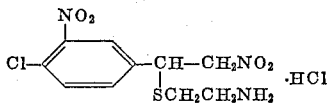

Example 9

A mixture of 5 parts of 2-chloro-β-methyl-β-nitrostyrene, 2.8 parts of 2-mercaptoethylamine hydrochloride, 0.15 part of pyrolidine, and 8 parts of methanol is allowed to stand at room temperature for about 24 hours. The solution is then evaporated to dryness in vacuo, and the residue is stirred with water and ether. The aqueous layer is separated, neutralized with sodium carbonate, and the resulting oil is treated with ether to effect crystallization. Recrystallization from methanol-ether produces pure 2-[α-(1-nitroethyl) - 2-chlorobenzylthio]ethylamine, M.P. 107–111°, which is represented by the structural formula

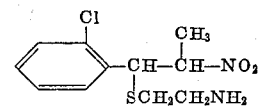

Example 10

To a mixture of 9.7 parts of 3,β-dinitrostyrene, 8.5 parts of N,N-diethyl-2-mercaptoethylamine hydrochloride, and 40 parts of methanol is added 0.15 part of pyrrolidine, whereupon the mixture becomes homogeneous. This solution is filtered through diatomaceous earth, and the filtrate is diluted with ether. The resulting crystals are collected by filtration, then recrystallized from methanol-ether to afford pure N,N-diethyl-2-[(α-nitromethyl)-3-nitrobenzylthio]ethylamine hydrochloride, M.P. 133–134.5° (dec.). This amine salt is represented by the structural formula

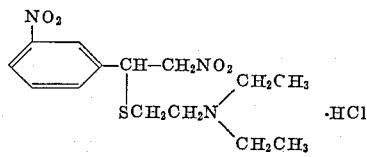

Example 11

A mixture of 4.4 parts of β-ethyl-β-nitrostyrene, 4.5 parts of N,N-diethyl-3-mercaptopropylamine, 15 parts of methanol, and 0.15 part of pyrrolidine is warmed on a steam bath, then is stored at room temperature for about 24 hours. The reaction mixture is filtered through diatomaceous earth, and the filtrate is diluted with ether to produce N,N-diethyl-3-[α-(1-nitropropyl)-benzylthio]propylamine hydrochloride. This substance is represented by the structural formula

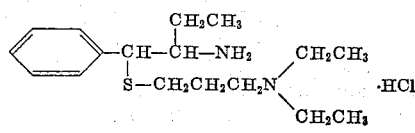

Example 12

A mixture of 4.05 parts of β-methyl-β-nitrostyrene, 3.5 parts of N-ethyl-2-mercaptoethylamine hydrochloride, 0.15 part of pyrrolidine, and 10 parts of methanol is allowed to stand at room temperature for about 24 hours, then is filtered through diatomaceous earth, and the filtrate is diluted with ether. The resulting precipitate is collected by filtration to yield N-ethyl-2-[α-(1-nitroethyl)

about 179–180° with decomposition. This substance is represented by the structural formula

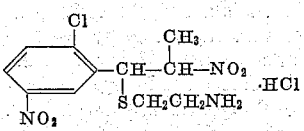

Example 23

A mixture of 10 parts of 4-fluorobenzaldehyde, 3 parts of ammonium carbonate, 11.4 parts of nitromethane, and 31.5 parts of acetic acid is heated at the reflux temperature for about 1½ hours, then is cooled to room temperature. The resulting crystals are collected by filtration and dried, resulting in 4-fluoro-β-nitrostyrene, which melts at about 96–99°.

A mixture of 5 parts of 4-fluoro-β-nitrostyrene, 3.4 parts of 2-mercaptoethylamine hydrochloride, 12 parts of methanol, and 0.1 part of pyrrolidine is allowed to react according to the procedure described in Example 1, thus producing 2-[(α-nitromethyl)-4-fluorobenzylthio]ethylamine hydrochloride, melting at about 163–166° (dec.). This compound is characterized further by the structural formula

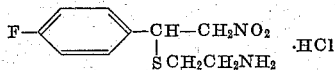

Example 24

A mixture of 25 parts of 2,4-dimethylbenzaldehyde, 28.5 parts of nitromethane, 78.8 parts of acetic acid, and 7.5 parts of ammonium carbonate is heated at the reflux temperature for about 2 hours, then is cooled and poured into a mixture of ice and water. The resulting aqueous mixture is extracted with ether, and the ether layer is separated, washed successively with water, aqueous sodium bicarbonate, and water, then is dried over anhydrous sodium sulfate and stripped of solvent at reduced pressure. The resulting residue is distilled at reduced pressure to afford 2,4-dimethyl-β-nitrostyrene, boiling at 119–126° at 0.2 mm. pressure.

A mixture of 17.7 parts of 2,4-dimethyl-β-nitrostyrene, 11.4 parts of 2-mercaptoethylamine hydrochloride, 0.15 part of pyrrolidine, and 12 parts of methanol is allowed to react according to the processes described in Example 1 in order to afford 2-[(α-nitromethyl)-2,4-dimethylbenzylthio]ethylamine hydrochloride, which substance melts at about 130–137° with decomposition. It is represented by the structural formula

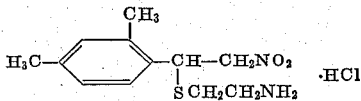

Example 25

A mixture of 19.1 parts of 4-isopropyl-β-nitrostyrene, 11.4 parts of 2-mercaptoethylamine hydrochloride, 0.15 part of pyrrolidine, and 16 parts of methanol is allowed to react by the procedure described in Example 1 to afford 2-[(α-nitromethyl)-4-isopropylbenzylthio]ethylamine hydrochloride, melting at about 135–138°. This substance is represented by the structural formula

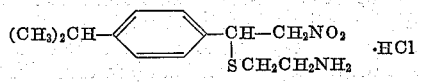

Example 26

A mixture of 19.8 parts of 4-chloro-β-methyl-β-nitrostyrene, 11.4 parts of 2-mercaptoethylamine hydrochloride, 0.15 part of pyrrolidine, and 16 parts of methanol is allowed to react according to the processes described in Example 1, thus affording 2-[α-(1-nitroethyl)-4-chlorobenzylthio]ethylamine hydrochloride, melting at about 131–135° and characterized further by the structural formula

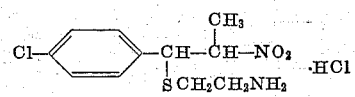

Example 27

A mixture of 50 parts of 2-chlorobenzaldehyde, 50 parts of 1-nitropropane, 10 parts of ammonium carbonate, and 157.5 parts of acetic acid is heated at the reflux temperature for about 8 hours, then is partially concentrated at reduced pressure and poured onto crushed ice. The organic layer is separated, washed successively with aqueous sodium bisulfite, aqueous sodium carbonate, and water, then dried over anhydrous sodium sulfate, and stripped of solvent to afford 2-chloro-β-ethyl-β-nitrostyrene as an oil.

To 190 parts by volume of fuming nitric acid is added, with cooling and stirring, 63.5 parts of 2-chloro-β-ethyl-β-nitrostyrene, and this reaction mixture is stirred for about one hour, then is poured onto crushed ice. The resulting aqueous mixture is extracted with ether, and the organic layer is washed with water, dried over anhydrous sodium sulfate, and concentrated to dryness at reduced pressure. Recrystallization of the residue from ethanol affords 2-chloro-β-ethyl-5,β-dinitrostyrene as a low-melting solid.

A mixture of 8.7 parts of 2-chloro-β-ethyl-5,β-dinitrostyrene, 3.8 parts of 2-mercaptoethylamine hydrochloride, 0.2 part of pyrrolidine, and 16 parts of methanol is allowed to react by the procedure described in Example 1, resulting in 2-[α-(1-nitropropyl)-2-chloro-5-nitrobenzylthio]ethylamine hydrochloride, melting at about 177–179° and characterized further by the structural formula

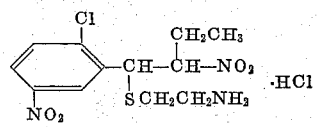

Example 28

A mixture of 13.9 parts of 2-chloro-5,β-dinitrostyrene, 6.8 parts of 2-mercaptoethylamine hydrochloride, 16 parts of methanol, 14 parts of ether, and 0.25 part of pyrrolidine is allowed to react by the procedure described in Example 1 to afford 2-[(α-nitromethyl)-2-chloro-5-nitrobenzylthio]ethylamine hydrochloride, melting at about 180–182°. This substance is represented by the structural formula

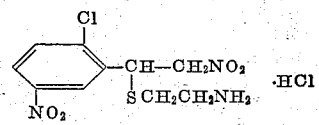

Example 29

A mixture of 7.65 parts of 2-fluoro-5,β-dinitrostyrene, 4 parts of 2-mercaptoethylamine hydrochloride, 8 parts of methanol, 7 parts of ether, and 0.15 part of pyrrolidine is allowed to react according to the procedure described in Example 1, resulting in 2-[(α-nitromethyl)-2-fluoro-5-nitrobenzylthio]ethylamine hydrochloride, which substance is characterized by a melting point of 143–146° and also by the structural formula

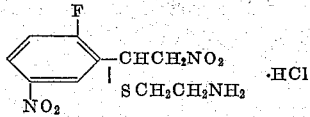

Example 30

A mixture of 4.7 parts of 2-bromo-5,β-dinitrostyrene, 1.9 parts of 2-mercaptoethylamine hydrochloride, 16 parts of methanol, and 0.1 part of pyrrolidine is allowed to react by the procedure of Example 1 to afford 2-[(α-nitrobenzylthio]ethylamine hydrochloride, which is represented by the structural formula

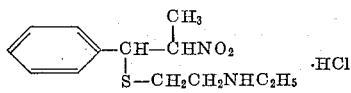

Example 13

A mixture of 11.2 parts of 4-methoxy-3,β-dinitrostyrene, 7.7 parts of N-n-propyl-2-mercaptoethylamine hydrochloride, 0.1 part of pyrrolidine, and 30 parts of methanol is heated gently, then is filtered through diatomaceous earth. Precipitation of the product by dilution of the filtrate with ether affords N-n-propyl-2-[(α-nitromethyl)-4-methoxy-3-nitrobenzylthio] - ethylamine hydrochloride, which is represented by the structural formula

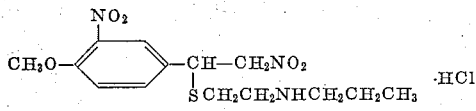

Example 14

A mixture of 9.7 parts of 3,β-dinitrostyrene, 11.2 parts of N,N-di-n-butyl-2-mercaptoethylamine hydrochloride, 0.15 part of pyrrolidine, and 50 parts of methanol is heated gently, then is filtered through diatomaceous earth. The cooled filtrate is diluted with ether, resulting in precipitation of the product, N,N-di-n-butyl-2-[(α-nitromethyl)-3 - nitrobenzylthio]ethylamine hydrochloride. This compound is represented by the structural formula

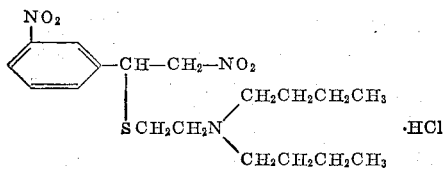

Example 15

The substitution of 6.4 parts of 3-mercaptopropylamine hydrochloride in the procedure of Example 3 results in 3-[(α-nitromethyl)-4 - chlorobenzylthio]propylamine hydrochloride of the structural formula

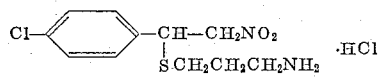

Example 16

A mixture of 4.4 parts of 3,4-dichloro-β-nitrostyrene, 2.3 parts of 2-mercaptoethylamine hydrochloride, 24 parts of methanol, and 0.15 part of pyrrolidine is allowed to react according to the procedure of Example 1, resulting in 2-[(α-nitromethyl) - 3,4 - dichlorobenzylthio]ethylamine hydrochloride, melting at about 174–177° (dec.). It is represented by the structural formula

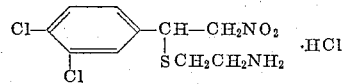

Example 17

The reaction of 7.2 parts of 2,4-dichloro-β-nitrostyrene, 2.3 parts of 2-mercaptoethylamine hydrochloride, 24 parts of methanol, and 0.15 part of pyrrolidine is allowed to react according to the processes described in Example 1 to afford 2-[(α - nitromethyl)-2,4-dichlorobenzylthio]ethylamine hydrochloride, melting at about 113.5–117°. This substance is represented by the structural formula

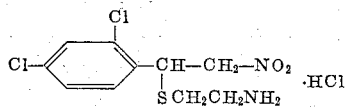

Example 18

To a solution of 5.5 parts of 3-chloro-β-nitrostyrene in 17.5 parts of ether is added successively a solution of 3.4 parts of 2-mercaptoethylamine hydrochloride in 20 parts of methanol and 0.1 part of pyrrolidine. This reaction mixture is allowed to react by the procedure described in Example 1, resulting in 2-[(α-nitromethyl)-3-chlorobenzylthio]ethylamine hydrochloride, melting at about 117.5–120°. It is represented by the structural formula

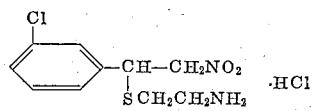

Example 19

The reaction of 5 parts of 2-chloro-β-nitrostyrene, 3.4 parts of 2-mercaptoethylamine hydrochloride, 16 parts of methanol, and 0.15 part of pyrrolidine by the processes described in Example 1 results in 2-[(α-nitromethyl)-2-chlorobenzylthio]ethylamine hydrochloride, which substance melts at about 109–113° and is characterized further by the structural formula

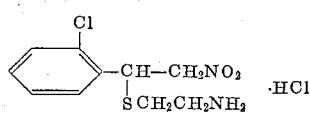

Example 20

A mixture of 6.8 parts of 4-bromo-β-nitrostyrene, 3.4 parts of 2-mercaptoethylamine hydrochloride, 16 parts of methanol, 7 parts of ether, and 0.15 part of pyrrolidine is allowed to react by the procedure of Example 1 to afford 2-[(α-nitromethyl)-4-bromobenzylthio]ethylamine hydrochloride, melting at about 180–181° (dec.). This substance is characterized further by the structural formula

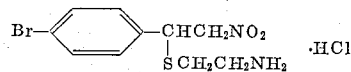

Example 21

A mixture of 5 parts of 2-fluoro-β-nitrostyrene, 3.4 parts of 2-mercaptoethylamine hydrochloride, 8 parts of methanol, and 0.15 part of pyrrolidine is allowed to react by the procedure of Example 1 to produce 2-[(α-nitromethyl) - 2 - fluorobenzylthio]ethylamine hydrochloride, melting at about 117–119° and represented by the structural formula

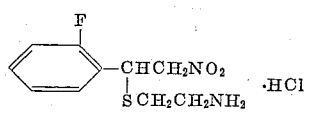

Example 22

To 30 parts by volume of fuming nitric acid is added, with stirring and cooling, 10 parts of 2-chloro-β-methyl-β-nitrostyrene, and the resulting solution is allowed to stand at room temperature for about 16 hours, then is poured into a mixture of ice and water. The resulting precipitate is collected by filtration, then is dried and dissolved in benzene. This organic solution is chromatographed on a silica gel column, and the benzene eluate is evaporated to dryness to afford a residue which is crystallized from acetone-methanol, resulting in 2-chloro-β-methyl-5,β-dinitrostyrene, M.P. about 64–67°.

A mixture of 3 parts of 2-chloro-β-methyl-5,β-dinitrostyrene, 1.4 parts of 2-mercaptoethylamine hydrochloride, 0.1 part of pyrrolidine, 8 parts of methanol, and 7 parts of ether is allowed to act by the procedure described in Example 1, resulting in 2-[α-(1-nitroethyl)-2-chloro-5-nitrobenzylthio]ethylamine hydrochloride, melting at methyl) - 2 - bromo-5-nitrobenzylthio]ethylamine hydrochloride, melting at about 185–187° and characterized also by the structural formula

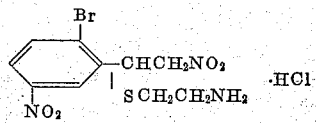

*Example 31*

To a mixture of 3 parts of ammonium carbonate, 11.4 parts of nitromethane, and 31.5 parts of acetic acid is added 10.3 parts of 2-methoxy-5-nitrobenzaldehyde, and the resulting reaction mixture is heated at the reflux temperature for about one hour, then is cooled. The resulting crystalline product which separates is collected by filtration, dried, and recrystallized from acetone to produce 2-methoxy-5,β-dinitrostyrene, melting at about 174–176°.

A mixture of 5.6 parts of 2-methoxy-5,β-dinitrostyrene, 2.8 parts of 2-mercaptoethylamine hydrochloride, 16 parts of methanol, 7 parts of ether, and 0.1 part of pyrrolidine is allowed to react by the procedure described in Example 1, resulting in 2-[(α-nitromethyl)-2-methoxy-5-nitrobenzylthio]ethylamine hydrochloride, which substance melts at about 163–166° with decomposition. It is characterized further by the structural formula

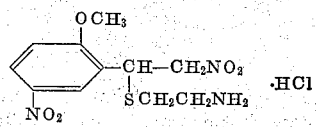

*Example 32*

A mixture of 3.85 parts of 4-cyano-β-nitrostyrene, 2.5 parts of 2-mercaptoethylamine hydrochloride, 8 parts of methanol, and 0.15 part of pyrrolidine is stirred until solution occurs, then is filtered through diatomaceous earth, and is diluted with ether. The resulting solid which precipitates is collected by filtration and dried to afford 2 - [(α - nitromethyl) - 4 - cyanobenzylthio]ethylamine hydrochloride, melting at about 166–169°. This compound is represented by the structural formula

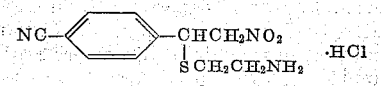

*Example 33*

A mixture of 13 parts of 2-chloro-β-ethyl-5,β-dinitrostyrene, 7 parts of N,N-dimethyl-2-mercaptoethylamine hydrochloride, 0.15 part of pyrrolidine, and 20 parts of methanol is stirred until solution occurs. Approximately 35 parts of ether is added and the resulting precipitate is removed by filtration. The filtrate is again diluted with ether, and the product which crystallizes is collected by filtration, then is recrystallized from methanol-ether to afford N,N-dimethyl-2-[α-(1-nitropropyl)-2-chloro-5-nitrobenzylthio]ethylamine hydrochloride, melting at about 155–158°. This compound is represented by the structural formula

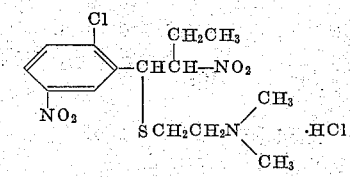

*Example 34*

A mixture of 13 parts of 1-nitrobutane, 18 parts of 2-chlorobenzaldehyde, 31.5 parts of acetic acid, and 2 parts of ammonium carbonate is heated at the reflux temperature for about 24 hours. The solvent is removed by distillation at reduced pressure and the resulting residue is extracted into ether. This organic solution is washed successively with water, aqueous sodium bisulfite, and aqueous sodium bicarbonate, then is dried over anhydrous sodium sulfate and concentrated at reduced pressure. This residue is then added slowly to 100 parts by volume of fuming nitric acid, with cooling and stirring, and stirring is continued for about one hour longer, after which time the reaction mixture is poured into ice and water. The resulting aqueous mixture is extracted with methylene chloride, and the organic extract is washed with water, then is dried and concentrated at reduced pressure. This residue is filtered through diatomaceous earth to yield 2-chloro-β-propyl-5,β-dinitrostyrene as an oil.

A mixture of 8.1 parts of 2-chloro-β-propyl-5,β-dinitrostyrene, 3 parts of 2-mercaptoethylamine hydrochloride, 0.15 part of pyrrolidine, and 4 parts of methanol is allowed to react by the procedure of Example 1, then is diluted with ether. The initial precipitate is separated by filtration and discarded, and the filtrate is allowed to stand at room temperature until crystallization occurs. The crystalline product is collected by filtration and dried to yield 2-[α-(1-nitrobutyl) - 2 - chloro-5-nitrobenzylthio]ethylamine hydrochloride, which substance melts at about 148–152° and is characterized further by the structural formula

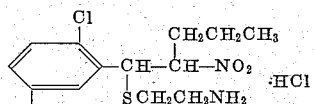

*Example 35*

A mixture of 25 parts of 2,6-dichlorobenzaldehyde, 25 parts of 1-nitropropane, 5 parts of ammonium carbonate, and 78.75 parts of acetic acid is heated at the reflux temperature for about 8 hours, then is cooled and poured onto crushed ice. The aqueous layer is separated by decantation, and the residual oil is dissolved in ether. This organic solution is washed successively with water, aqueous sodium bisulfite, and water, then is dried over anhydrous sodium sulfate and evaporated to dryness in an atmosphere of nitrogen. The resulting residue solidifies on cooling to afford 2,6-dichloro-β-ethyl-β-nitrostyrene.

A mixture of 8.5 parts of 2,6-dichloro-β-ethyl-β-nitrostyrene, 3.4 parts of 2-mercaptoethylamine hydrochloride, 0.15 part of pyrrolidine, and 4 parts of methanol is heated on the steam bath to effect homogeneity, and the resulting solution is kept at room temperature for several hours. Ether is then added, and the initial precipitate is removed by filtration. The further addition of ether results in crystallization of the product, which is collected by filtration and dried, resulting in 2-[α-(1-nitropropyl)-2,6-dichlorobenzylthio]ethylamine hydrochloride, melting at about 130–133°. This compound is represented by the structural formula

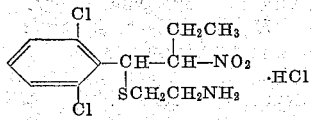

*Example 36*

To 100 parts by volume of fuming nitric acid is added 33 parts of 2,6-dichloro-β-ethyl-β-nitrostyrene, with cooling and stirring, and stirring is continued for about one hour longer. The reaction mixture is then poured onto crushed ice, and the resulting aqueous mixture is extracted with methylene chloride. The methylene chloride extracts are washed with water, dried over anhydrous sodium sulfate, and concentrated to dryness to afford a residue, which is recrystallized from methanol, resulting in 2,6-dichloro-β-ethyl-3,β-dinitrostyrene, melting at about 102–106°.

A mixture of 5.8 parts of 2,6-dichloro-β-ethyl-3,β-dinitrostyrene, 2.3 parts of 2-mercaptoethylamine hydrochloride, 0.15 part of pyrrolidine, and 8 parts of methanol is stirred at room temperature until solution occurs, at which time the reaction mixture is filtered through diatomaceous earth, and the filtrate is diluted with ether. The resulting crystalline product is collected by filtration and dried to yield 2-[α-(1-nitropropyl)-2,6-dichloro-3-nitrobenzylthio]ethylamine hydrochloride, melting at about 196–198° with decomposition. It is further characterized by the structural formula

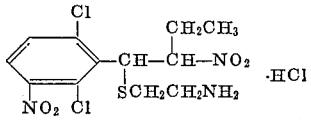

*Example 37*

A mixture of 20.4 parts of 1-nitrooctane, 18 parts of 2-chlorobenzaldehyde, 31.5 parts of acetic acid, and 2 parts of ammonium carbonate is heated at the reflux temperature for about 23 hours, then is stripped of solvent at reduced pressure. The resulting residue is extracted with ether, and the organic layer is separated, washed successively with water, aqueous sodium bisulfite, and aqueous sodium bicarbonate, then is dried over anhydrous sodium sulfate and concentrated to afford 2-chloro-β-heptyl-5,β-dinitrostyrene as an oil.

To 100 parts by volume of fuming nitric acid is added 16.8 parts of 2-chloro-β-heptyl-β-nitrostyrene, with cooling and stirring. After the addition is complete, the reaction mixture is stirred for about one hour, then is poured onto crushed ice. This aqueous mixture is then extracted with ether, and the organic layer is separated, washed with water, dried over anhydrous sodium sulfate, and concentrated to an oil. This oil is adsorbed on a silica gel chromatographic column and is eluted with 50% hexane in benzene to afford 2-chloro-β-heptyl-5,β-dinitrostyrene.

A mixture of 4.75 parts of 2-chloro-β-heptyl-5,β-dinitrostyrene, 1.65 parts of 2-mercaptoethylamine hydrochloride, 0.15 part of pyrrolidine, 4 parts of methanol, and 7 parts of ether is heated to achieve solution, then is filtered through diatomaceous earth. The reaction mixture is concentrated at reduced pressure to afford the oily product, 2-[α-(1-nitrooctyl)-2-chloro-5-nitrobenzylthio]ethylamine hydrochloride. This substance is represented by the structural formula

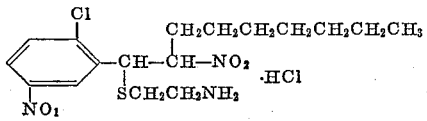

*Example 38*

A mixture of 25 parts of 4-trifluoromethylbenzaldehyde, 25 parts of 1-nitropropane, 5 parts of ammonium carbonate, and 75 parts of acetic acid is heated at the reflux temperature for about 33 hours, then is poured onto crushed ice. The aqueous layer is separated by decantation, then is extracted with ether. The ether extract is combined with the original organic layer, and these combined solutions are washed successively with water, aqueous sodium carbonate, and aqueous sodium bisulfite. This washed solution is dried over anhydrous sodium sulfate and is concentrated to dryness to yield 4-trifluoromethyl-β-ethyl-β-nitrostyrene.

A mixture of 5 parts of 4-trifluoromethyl-β-ethyl-β-nitrostyrene, 2.1 parts of 2-mercaptoethylamine hydrochloride, 0.15 part of pyrrolidine, and 4 parts of methanol is heated on the steam bath for about one hour, then is cooled and diluted with ether. The resulting precipitate is collected by filtration, then is dissolved in methanol and reprecipitated with ether. The initial crystalline material is separated by filtration and discarded, and the filtrate is allowed to stand until crystallization is complete. The latter material is collected by filtration and dried to afford 2-[α-(1-nitropropyl)-4-trifluoromethylbenzylthio]ethylamine hydrochloride, melting at about 162–165° with decomposition. This compound is represented by the structural formula

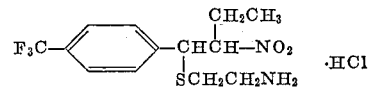

*Example 39*

The substitution of 70 parts of 3-trifluoromethyl-β-methyl-β-nitrostyrene in the procedure of Example 1 results in 2-[α-(1-nitroethyl) - 3 - trifluoromethylbenzylthio]ethylamine hydrochloride. This substance is represented by the structural formula

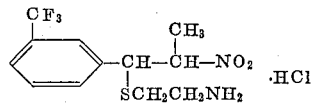

*Example 40*

The substitution of 17.1 parts of 3-methylbenzaldehyde in the procedure of Example 38 results in 2-[α-(1-nitropropyl)-3-methylbenzzylthio]ethylamine hydrochloride of the structural formula

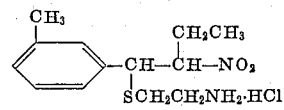

*Example 41*

By substituting 64.2 parts of 3-cyano-β-nitrostyrene and otherwise proceeding according to the procedure of Example 1, 2-[(α-nitromethyl) - 3 - cyanobenzylthio]ethylamine hydrochloride is obtained. This compound is represented by the structural formula

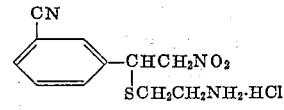

*Example 42*

The substitution of 71.6 parts of 2,β-dinitrostyrene in the procedure of Example 1 results in 2-[(α-nitromethyl)-2-nitrobenzylthio]ethylamine hydrochloride of the structural formula

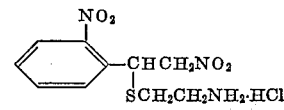

*Example 43*

By substituting 93.8 parts of 3,4-dimethoxy-6,β-dinitrostyrene and otherwise proceeding according to the processes of Example 1, 2-[(α-nitromethyl)-3,4-dimethoxy-6-nitrobenzylthio]ethylamine hydrochloride of the structural formula

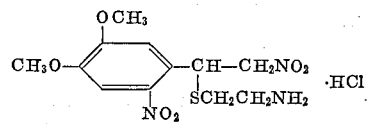

is obtained.

What is claimed is:

1. A compound of the formula

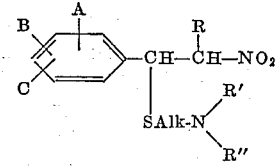

wherein A, B, and C are selected from the group consisting of hydrogen, halogens of atomic weight less than 100, lower alkyl, nitro, methoxy, cyano, and trifluoromethyl radicals, A and B together comprise a methylenedioxy radical, R, R', and R'' are selected from the group consisting of hydrogen and lower alkyl radicals, and Alk is a lower alkylene radical.

2. 2-[(α-nitromethyl)benzylthio]ethylamine.
3. 2-[(α - nitromethyl)-3,4-methylenedioxybenzylthio]ethylamine.
4. 2-[α-(1 - nitroethyl)-2-chlorobenzylthio]ethylamine.
5. N,N-diethyl-2-[(α - nitromethyl)-3-nitrobenzylthio]ethylamine.
6. 2-[(α-nitromethyl) - 3,4 - dichlorobenzylthio]ethylamine.
7. 2-[(α-nitromethyl) - 4 - isopropylbenzylthio]ethylamine.
8. 2-[α-(1 - nitroethyl)-4-chlorobenzylthio]ethylamine.
9. N,N - dimethyl-[α-(1 - nitropropyl) - 2 - chloro-5-nitro]ethylamine.
10. 2-[α-(1 - nitropropyl) - 2,6 - dichloro - 3 - nitrobenzylthio]ethylamine.
11. 2-[α-(1 - nitropropyl) - 2,6 - dichlorobenzylthio]ethylamine.
12. A compound of the formula

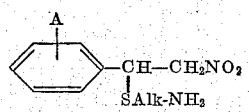

wherein A is a halogen of atomic weight less than 100 and Alk is a lower alkylene radical.

13. 2-[(α - nitromethyl) - 4 - chlorobenzylthio]ethylamine.
14. 2-[(α - nitromethyl) - 4 - bromobenzylthio]ethylamine.
15. 2-[(α - nitromethyl) - 2 - fluorobenzylthio]ethylamine.
16. A compound of the formula

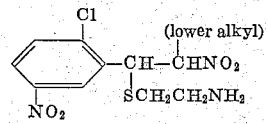

17. 2-[α-(1 - nitroethyl) - 2 - chloro-5-nitrobenzylthio]ethylamine.
18. 2-[α(1 - nitropropyl) - 2 - chloro-5-nitrobenzylthio]ethylamine.
19. 2-[α-(1 - nitrobutyl) - 2 - chloro-5-nitrobenzylthio]ethylamine.
20. A compound of the formula

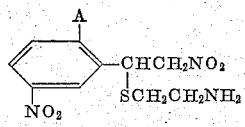

wherein A is a halogen of atomic weight less than 100.

References Cited in the file of this patent
UNITED STATES PATENTS

| | | |
|---|---|---|
| 2,511,961 | Bahner | June 19, 1950 |
| 2,523,233 | Prill | Sept. 19, 1950 |
| 2,769,839 | Fincke | Nov. 6, 1956 |

OTHER REFERENCES

Cason et al.: J. Am. Chem. Soc., vol 73, pp. 142–145 (1951), QD A 5.

UNITED STATES PATENT OFFICE
CERTIFICATE OF CORRECTION

Patent No. 3,166,572            January 19, 1965

Robert C. Tweit

It is hereby certified that error appears in the above numbered patent requiring correction and that the said Letters Patent should read as corrected below.

Column 3, line 41, strike out "of", second occurrence; column 4, line 14, for "pyrolidine" read -- pyrrolidine --; same column 4, lines 62 to 65, the formula should appear as shown below instead of as in the patent:

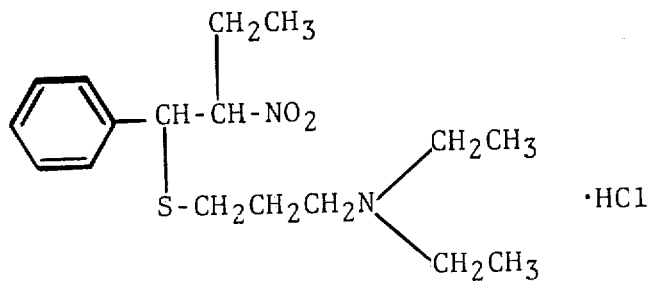

column 9, lines 4 to 9, the formula should appear as shown below instead of as in the patent:

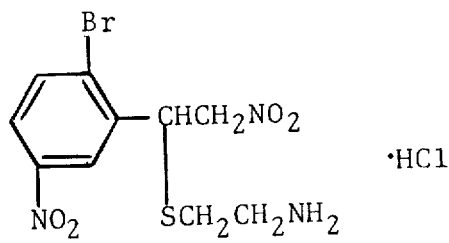

column 11, lines 47 to 51, the formula should appear as shown below instead of as in the patent:

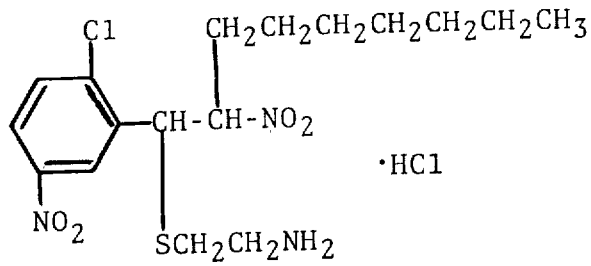

column 12, line 24, for "methylbenzzylthio" read -- methylbenzylthio --.

Signed and sealed this 22nd day of June 1965.

(SEAL)
Attest:

ERNEST W. SWIDER
Attesting Officer

EDWARD J. BRENNER
Commissioner of Patents